(12) United States Patent  
Rock et al.

(10) Patent No.: US 9,356,306 B2  
(45) Date of Patent: May 31, 2016

(54) PLATED PHOTOPOLYMER BASED FUEL CELL

(71) Applicant: GM GLOBAL TECHNOLOGY OPERATIONS LLC, Detroit, MI (US)

(72) Inventors: Jeffrey A. Rock, Rochester Hills, MI (US); Steven G. Goebel, Victor, NY (US); Gerald W. Fly, Geneseo, NY (US); Alan J. Jacobsen, Woodland Hills, CA (US); Joanna A. Kolodziejska, Glendale, CA (US); Hung D. Nguyen, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 14/197,251

(22) Filed: Mar. 5, 2014

(65) Prior Publication Data

US 2014/0186749 A1 Jul. 3, 2014

Related U.S. Application Data (62) Division of application No. 13/053,621, filed on Mar. 22, 2011, now Pat. No. 8,703,351.

(51) Int. Cl.  
    *H01M 8/10* (2016.01)  
    *H01M 8/02* (2016.01)

(52) U.S. Cl.  
    CPC .......... *H01M 8/1097* (2013.01); *H01M 8/0258* (2013.01); *Y02E 60/50* (2013.01)

(58) Field of Classification Search  
None  
See application file for complete search history.

(56) References Cited

U.S. PATENT DOCUMENTS

| 2008/0081239 | A1* | 4/2008 | Okusawa | H01M 8/0267 429/437 |
|---|---|---|---|---|
| 2010/0159294 | A1 | 6/2010 | Fly et al. | |
| 2010/0159303 | A1 | 6/2010 | Rock et al. | |
| 2010/0159398 | A1 | 6/2010 | Rock et al. | |
| 2010/0291465 | A1 | 11/2010 | Rock et al. | |
| 2010/0291466 | A1 | 11/2010 | Rock et al. | |
| 2011/0090480 | A1 | 4/2011 | Lai et al. | |
| 2011/0091813 | A1 | 4/2011 | Lai et al. | |

* cited by examiner

*Primary Examiner* — Ula C Ruddock  
*Assistant Examiner* — Tony Chuo  
(74) *Attorney, Agent, or Firm* — Fraser Clemens Martin & Miller LLC; James D. Miller (57) ABSTRACT

A fuel cell component includes a first fluid distribution layer, a second fluid distribution layer, a cap layer, a third fluid distribution layer, and a pair of fluid diffusion medium layers. The individual layers are polymeric, mechanically integrated, and formed from a radiation-sensitive material. The first fluid distribution layer, the second fluid distribution layer, the cap layer, the third fluid distribution layer, and the pair of fluid diffusion medium layers are coated with an electrically conductive material. A pair of the fuel cell components may be arranged in a stack with a membrane electrode assembly therebetween to form a fuel cell.

20 Claims, 8 Drawing Sheets

PLATED PHOTOPOLYMER BASED FUEL CELL

CROSS-REFERENCE TO RELATED APPLICATIONS

This application is a divisional of U.S. patent application Ser. No. 13/053,621 filed on Mar. 22, 2011 now U.S. Pat. No. 8,703,351. The entire disclosure of the above application is incorporated herein by reference.

FIELD OF THE INVENTION

The present disclosure relates to a fuel cell component and more particularly to a method for fabricating a fuel cell component with radiation-sensitive materials.

BACKGROUND OF THE INVENTION

A fuel cell has been proposed as a clean, efficient and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM) such as carbon fiber paper, which facilitates a delivery of reactants such as hydrogen to the anode and oxygen to the cathode. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load such as an electric motor. The protons react with the oxygen and the electrons in the cathode to generate water.

It has been desirable to fabricate the fuel cell and related fuel cell components from radiation-sensitive materials. The formation of structures such as micro-truss structures from radiation-sensitive materials are described in Assignee's co-pending U.S. patent application Ser. No. 12/339,308, the entire disclosure of which is hereby incorporated herein by reference. The formation of radiation-cured fuel cell components is further described in Assignee's co-pending U.S. patent application Ser. Nos. 12/341,062, 12/341,105, 12/603, 147, 12/466,646, 12/466,405, and 12/603,120, the entire disclosures of which are hereby incorporated herein by reference.

Known fuel cells formed from radiation-sensitive materials have had a conductive plating on diffusion media features that was relatively thinner than a conductive plating on flow field features. Other fabrication processes have also generally been performed between the respective plating processes in order to form additional features of the radiation-cured fuel cell. These additional processing steps are undesirable and add to manufacturing complexity.

There is a continuing need for a fuel cell component fabricated from radiation-sensitive materials which integrates both diffusion media and a bipolar plate into a single component, and a method for fabricating the fuel cell component with a minimum number of process steps. Desirably, the fuel cell component and method facilitates a continuous process sequence, permits a removal of all uncured radiation-sensitive material in a single step, and allows for a single plating process for both the diffusion media and the flowfields of the fuel cell component.

SUMMARY OF THE INVENTION

In concordance with the instant disclosure, a fuel cell component fabricated from radiation-sensitive materials which integrates both diffusion media and a bipolar plate into a single component, and a related method for fabricating the fuel cell component with a minimum number of process steps that facilitates a continuous process sequence, permits a removal of all uncured radiation-sensitive material in a single step, and allows for a single plating process for both the diffusion media and the flowfields of the fuel cell component, are surprisingly discovered.

In a first embodiment, a fuel cell component includes an electrically conductive substrate having a first surface and a second surface. The first surface and the second surface are disposed on opposite sides of the electrically conductive substrate. A first fluid distribution layer has a plurality of first channels and a plurality of second channels disposed on the first surface of the electrically conductive substrate. A second fluid distribution layer is disposed on the second surface of the electrically conductive substrate. A cap layer is disposed on the first fluid distribution layer. The first channels of the first fluid distribution layer are covered by the cap layer. The second channels of the first fluid distribution layer are not covered by the cap layer. A third fluid distribution layer is disposed on the cap layer. The cap layer separates the first channels of the first fluid distribution layer from the third fluid distribution layer. The second channels of the first fluid distribution layer are in fluid communication with the third fluid distribution layer. A pair of diffusion medium layers is provided and includes a first diffusion medium layer and a second diffusion medium layer. The first diffusion medium layer is disposed on the third fluid distribution layer. The second diffusion medium layer is disposed on the second fluid distribution layer.

In another embodiment, a fuel cell includes a pair of the fuel cell components with a membrane electrode assembly disposed therebetween.

In a further embodiment, a method for fabricating the fuel cell component includes the steps of: providing an electrically conductive substrate having a first surface and a second surface, the first surface and the second surface disposed on opposite sides of the electrically conductive substrate; disposing a plurality of layers of radiation-sensitive material on the first surface and the second surface of the electrically conductive substrate; forming a first fluid distribution layer having a plurality of first channels and a plurality of second channels on the first surface of the electrically conductive substrate; forming a second fluid distribution layer on the second surface of the electrically conductive substrate; forming a cap layer on the first fluid distribution layer, the first channels of the first fluid distribution layer covered by the cap layer and the second channels of the first fluid distribution layer not covered by the cap layer; forming a third fluid distribution layer on the cap layer, the cap layer separating the first channels of the first fluid distribution layer from the third fluid distribution layer, the second channels of the first fluid distribution layer in fluid communication with the third fluid distribution layer; and forming a pair of diffusion medium layers including a first diffusion medium layer and a second diffusion medium layer, the first diffusion medium layer formed on the third fluid distribution layer, and the second diffusion medium layer formed on the second fluid distribution layer. The steps of forming the first fluid distribution layer, the second fluid distribution layer, the cap layer, the third fluid distribution layer, and the pair of diffusion medium layers are performed by selectively exposing the plurality of layers of radiation-sensitive material to a plurality of radiation beams from at least one radiation source.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

Figure 1:
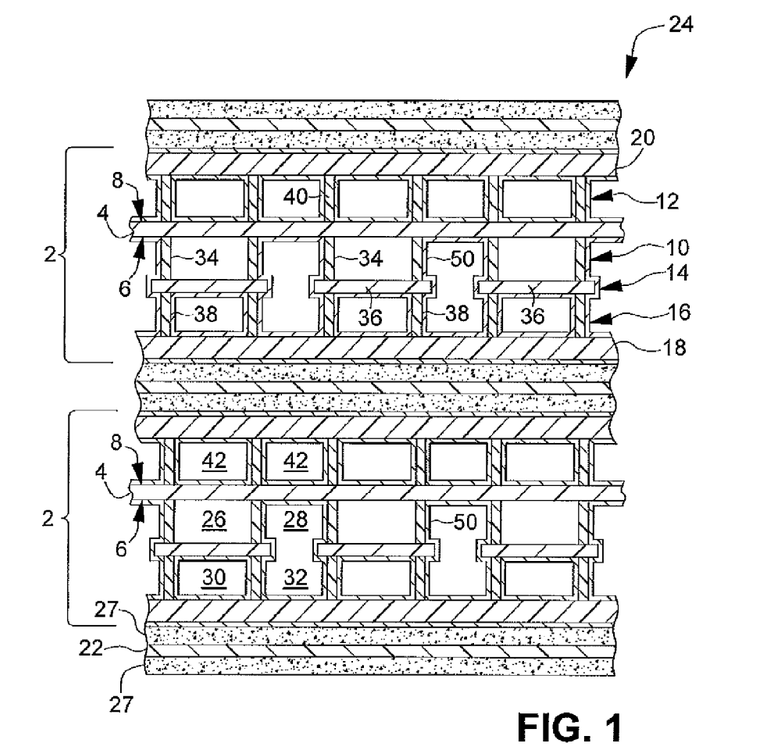
FIG. 1 is a side cross-sectional elevational view of a fuel cell according to one embodiment of the present disclosure, showing a pair of fuel cell components having a membrane electrode assembly disposed therebetween.
Figure 2:
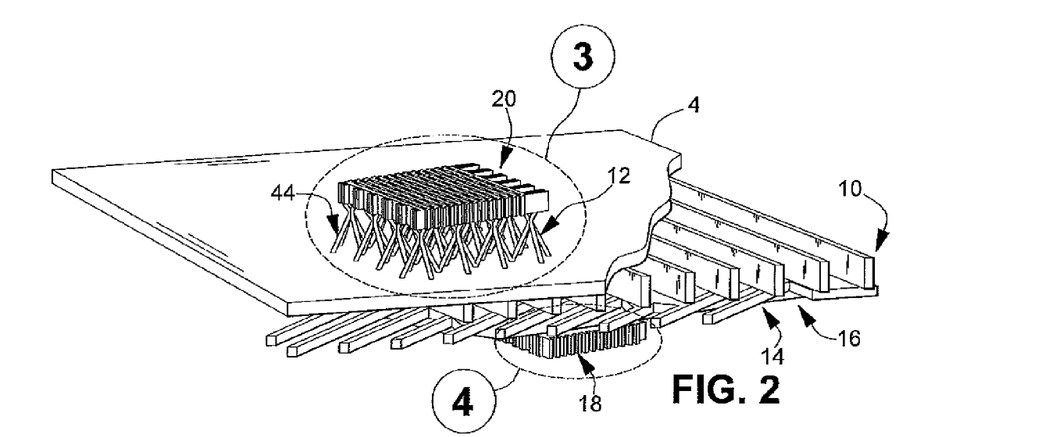
FIG. 2 is a fragmentary top perspective view of a fuel cell component according to one embodiment of the present disclosure.
Figure 3:
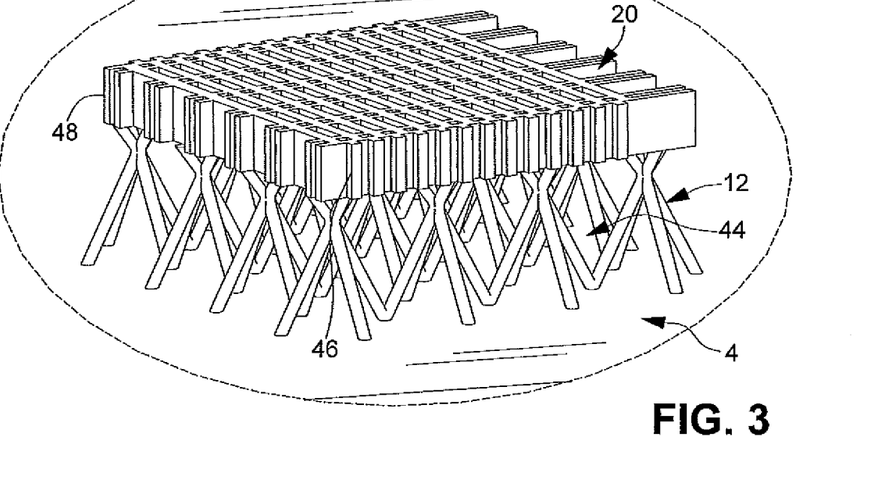
FIG. 3 is an enlarged fragmentary perspective view of the fuel cell component illustrated in FIG. 2 identified by circle 3.
Figure 4:
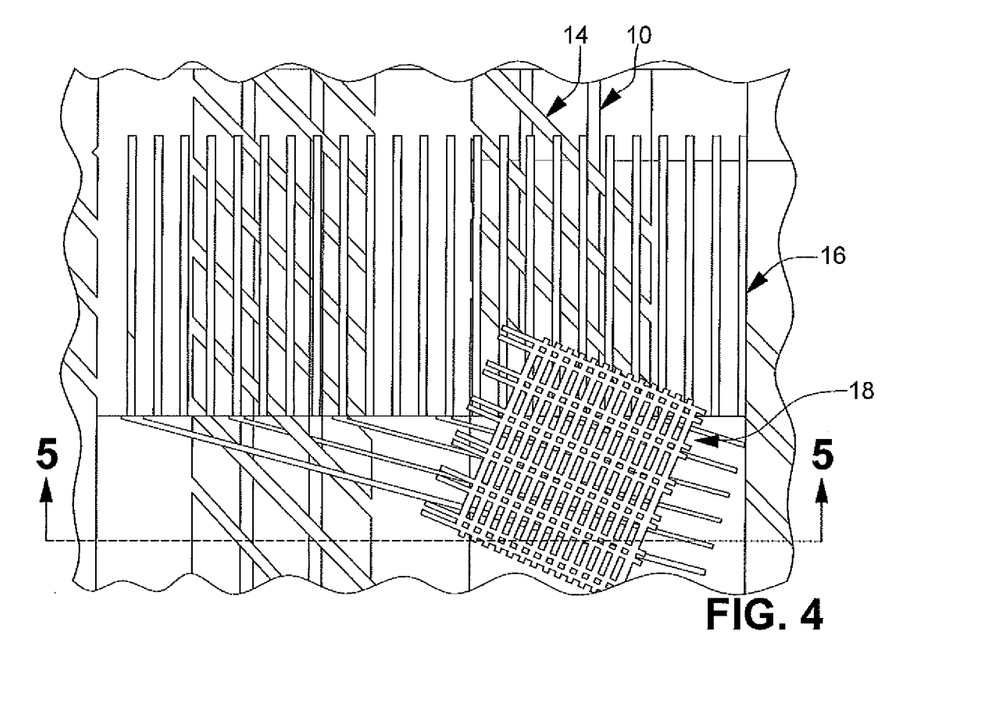
FIG. 4 is fragmentary bottom plan view of the fuel cell component illustrated in FIG. 2, identified by circle 4.
Figure 5:
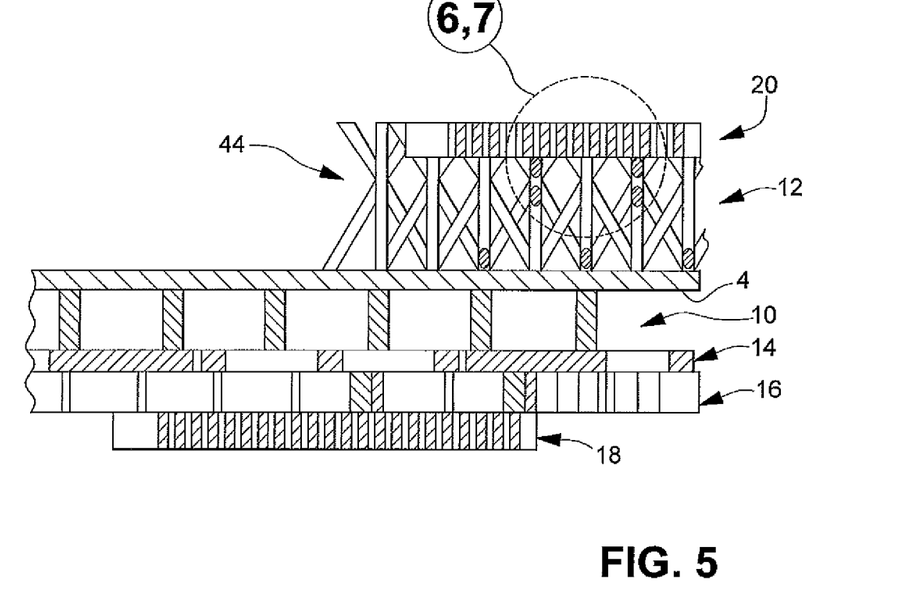
FIG. 5 is a side cross-sectional elevational view of the fuel cell component illustrated in FIG. 4, and taken along section line 5-5.
Figure 6:
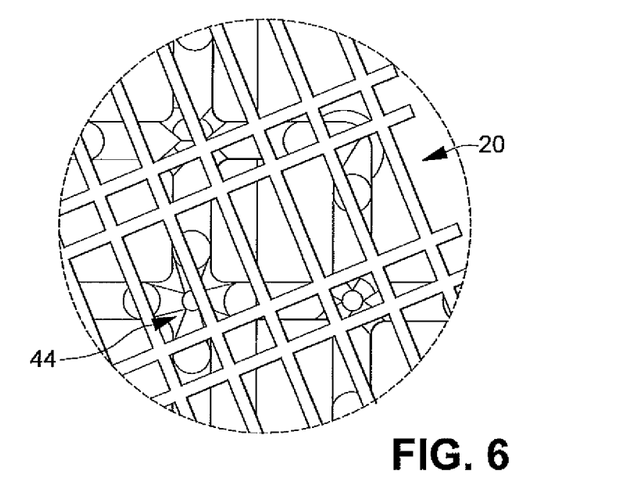
FIG. 6 is an enlarged fragmentary plan view of the fuel cell component illustrated in FIG. 5, and identified by circle 6, 7.
Figure 7:
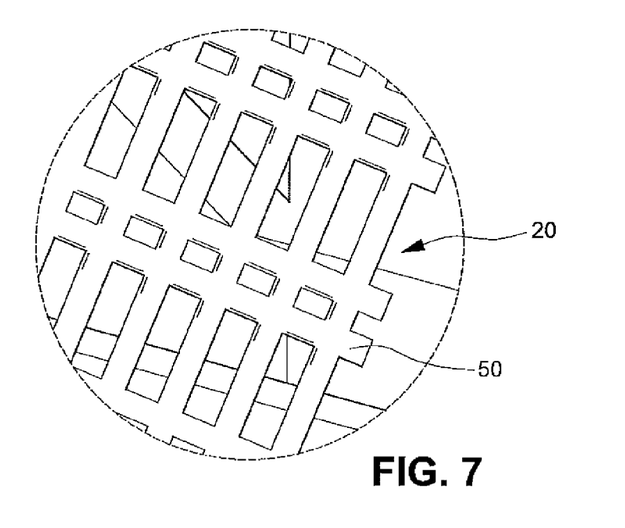
FIG. 7 is an enlarged fragmentary plan view of the fuel cell component illustrated in FIG. 6, with a further plating of an electrically conductive material on the fuel cell component.

As shown in FIG. 1, the present disclosure includes a fuel cell component 2. The fuel cell component 2 has an electrically conductive substrate 4. The electrically conductive substrate 4 has a first surface 6 and a second surface 8. The first surface 6 and the second surface 8 are disposed on opposite sides of the electrically conductive substrate 4. In a particularly illustrative embodiment, the electrically conductive substrate 4 is a stainless steel foil. A skilled artisan may select other suitable materials for the electrically conductive substrate 4, as desired.

The fuel cell component 2 has a first fluid distribution layer 10, a second fluid distribution layer 12, a cap layer 14, a third fluid distribution layer 16, and a pair of diffusion medium layers 18, 20. The pair of diffusion medium layers 18, 20 includes a first diffusion medium layer 18 and a second diffusion medium layer 20. A plurality of the fuel cell components 2 may be disposed in a stack with a membrane electrode assembly 22 disposed therebetween to form a fuel cell 24. The fuel cell 24 may also include a microporous layer 27 between each membrane electrode assembly 22 and the adjacent fuel cell component 2.

The first fluid distribution layer 10, the second fluid distribution layer 12, the third fluid distribution layer 16, the cap layer 14, and the pair of diffusion medium layers 18, 20 are formed from one or more radiation-sensitive materials, for example, as described in Assignee's co-pending U.S. patent application Ser. Nos. 12/341,062, 12/341,105, 12/603,147, 12/466,646, 12/466,405, and 12/603,120. In one particular embodiment, the first fluid distribution layer 10, the second fluid distribution layer 12, the third fluid distribution layer 16, the cap layer 14, and the pair of diffusion medium layers 18, 20 are fabricated by photopolymerization of a radiation-curable material.

The first fluid distribution layer 10 has a plurality of first channels 26 and a plurality of second channels 28. The plurality of first channels 26 and the plurality of second channels 28 are disposed on the first surface 6 of the electrically conductive substrate 4. The second fluid distribution layer 12 is disposed on the second surface 8 of the electrically conductive substrate 4. The cap layer 14 is disposed on the first fluid distribution layer 10. The first channels 26 of the first fluid distribution layer 10 are covered by the cap layer 14. The second channels 28 of the first fluid distribution layer 10 are not covered by the cap layer 14. The third fluid distribution layer 16 is disposed on the cap layer 14. The third distribution layer 16 has a plurality of first channels 30 and a plurality of second channels 32. The cap layer 14 separates the first channels 26 of the first fluid distribution layer 10 from the first channels 30 of the third fluid distribution layer 16. The second channels 28 of the first fluid distribution layer 10 are in fluid communication with the second channels 32 of the third fluid distribution layer 16. In particular embodiments, due to a nonalignment of the respective channels, all of the first and second channels 30, 32 of the third fluid distribution layer 16 are in fluid communication with the uncapped second channels 28 of the first fluid distribution layer 10. The first diffusion medium layer 18 is disposed on the third fluid distribution layer 16. The second diffusion medium layer 20 is disposed on the second fluid distribution layer 12.

Illustratively, the first fluid distribution layer 10 has a plurality of first polymeric ribs 34 extending outwardly from the first surface 6 of the electrically conductive substrate 4. The first polymeric ribs 34 may be substantially perpendicular to the first surface 6, or angled with respect to the first surface 6. The first channels 26 are defined by first spans between the first polymeric ribs 34. The second channels 28 are defined by second spans between the first polymeric ribs 34. The first and second spans may alternate across the first fluid distribution layer 10, or may be disposed in other arrangements, as desired. The cap layer 14 includes a plurality of polymeric cap segments 36 that bridge the first spans between the first polymeric ribs 34. The second spans between the first polymeric ribs 34 remain exposed even when the cap layer 14 is disposed on the first fluid distribution layer 10.

The third fluid distribution layer 16 includes a plurality of third polymeric ribs 38. The third polymeric ribs 38 extend outwardly from the polymeric cap segments 36. The third polymeric ribs 38 may be substantially perpendicular to a surface of the polymeric cap segments 36, or angled with respect to the surface of the polymeric cap segments 36. The third polymeric ribs 38 define the plurality of first channels 30 and the plurality of second channels 32 of the third fluid distribution layer 16.

As shown in FIG. 1, the second fluid distribution layer 12 of the fuel cell component 2 may include a plurality of second polymeric ribs 40. The second polymeric ribs 40 extend outwardly from the second surface 8 of the electrically conductive substrate 4. The second polymeric ribs 40 may be substantially perpendicular to the second surface 8, or angled with respect to the second surface 8. The second polymeric ribs 40 form a plurality of channels 42 of the second fluid distribution layer 12. In an alternative embodiment illustrated in FIGS. 2-7, the second fluid distribution layer 12 may include a polymeric micro-truss network 44. The second polymeric ribs 40 may be used in conjunction with the polymeric micro-truss network 44, for example, to control a compliance of the second fluid distribution layer 12. Like polymeric micro-truss networks 44 may also be employed in conjunction with the various first, second, and third polymer ribs 34, 38, 40 forming the flowfields of the first fluid distribution layer 10, the second fluid distribution layer 12, and the third fluid distribution layer 16.

In should be understood that each of the pair of diffusion medium layers 18, 20 according to the present disclosure is fabricated from a polymer like the underlying first, second, and third fluid distribution layers 10, 12, 16. As shown in FIGS. 2-7, at least one of the first diffusion medium layer 18 and the second diffusion medium layer 20 may be formed as a polymeric grid. The polymeric grid may have a plurality of regularly spaced first walls 46 and a plurality of regularly spaced second walls 48. In certain examples, at least one of the first walls 46 and the second walls 48 are not regularly spaced, but have a varying spacing relative to one another. The first walls 46 may be disposed substantially orthogonal to the second walls 48. In other examples, the first walls 46 are not orthogonal to the second walls 48 and may form diamond shaped pores. Other polymeric structures and geometries for forming the porous diffusion medium layers 18, 20 are also within the scope of the present disclosure.

With renewed reference to FIG. 1, the fuel cell component 2 further includes an electrically conductive coating 50. The electrically conductive coating 50 may be formed from any electrically conductive material exhibit sufficient corrosion resistance under the operating conditions of the fuel cell 24. The electrically conductive coating 50 is illustratively deposited on each of the electrically conductive substrate 4, the first fluid distribution layer 10, the second fluid distribution layer 12, the third fluid distribution layer 16, the cap layer 14, and the pair of diffusion medium layers 18, 20. Being deposited on each of the electrically conductive substrate 4, the first fluid distribution layer 10, the second fluid distribution layer 12, the third fluid distribution layer 16, the cap layer 14, and the pair of diffusion medium layers 18, 20, the electrically conductive coating 50 facilitates conductivity through a thickness of the fuel cell component 2. In a particular embodiment, the electrically conductive coating 50 is not formed on an inner surface of each of the first channels 26, an inner surface of the cap layer 14 covering each the first channels 26, and a surface of the electrically conductive substrate 4 opposite the inner surface of the cap layer 14. The first channels 26 may thereby be employed for transport of coolant through the fuel cell component 2, and substantially insulated from the electrically conductive coating 50. It should be appreciated that the uncapped second channels 28 of the first fluid distribution layer 10 provide an open path to the substrate 4 to allow conduction through the fuel cell component 2, while the cap layer 14 blocks the coolant from leaking from the first channels 26 into the third fluid distribution layer 16. It should also be appreciated that the electrically conductive coating 50 may advantageously be deposited in a single deposition step.

With reference to FIGS. 8A-8H, the electrically conductive substrate 4 may include a pair of headers 100, 102 with cathode and anode reactant inlets 104, 106, cathode and anode reactant outlets 108, 110, and a coolant inlet and outlet 112, 114. The first fluid distribution layer 10, the second fluid distribution layer 12, the third fluid distribution layer 16, the cap layer 14, and the diffusion medium layers 18, 20 are disposed between the headers 100, 102.

Figure 8A:
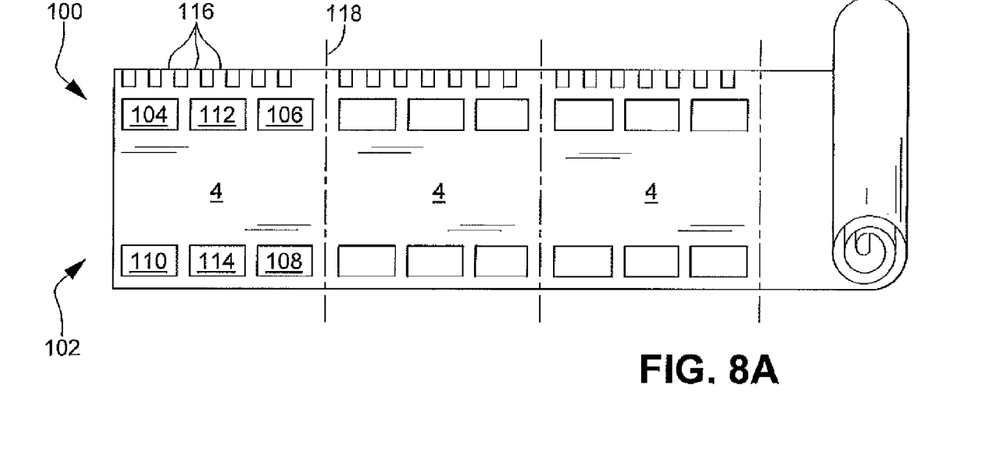
FIGS. 8A-8H are perspective views illustrating a stepwise fabrication of the fuel cell component according to one embodiment of the present disclosure.
Figure 8B:
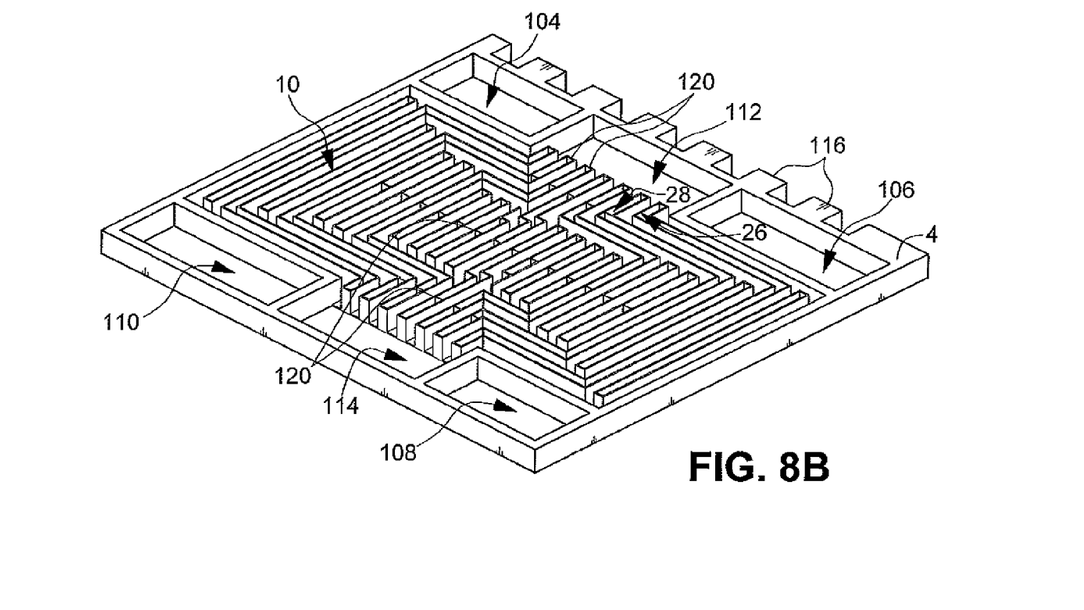
Figure 8C:
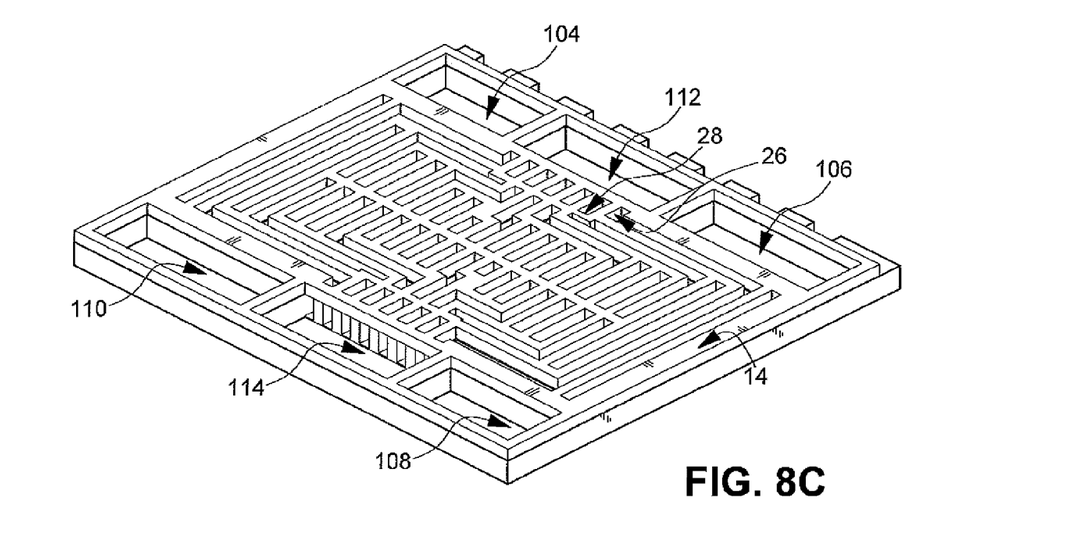

In one particular embodiment, illustratively depicted in FIGS. 8B and 8C, the fuel cell component 2 is configured to distribute a coolant in the first channels 26 of the first fluid distribution layer 10. The coolant may be distributed through the first channels 26 of the first fluid distribution layer 10 from the coolant inlet 112 to the coolant outlet 114, for example. A cathode reactant such as air or oxygen from a pressurized oxygen source, as a nonlimiting example, may be distributed in the second channels 28 of the first fluid distribution layer 10. The first fluid distribution layer 10 thereby may operate as a discontinuous coolant distribution layer within the fuel cell component 2.

The third distribution layer 16 is also configured to distribute the cathode reactant in the first channels 30 and the second channels 32. The second channels 28 of the first fluid distribution layer 10 and the second channels 32 of the third fluid distribution layer 16 are open to one another and effectively combine to form larger, unitary channels for distribution of the cathode reactant through the fuel cell component 2. The first channels 30 of the third fluid distribution layer 16 may also be open to the second channels 28 of the first fluid distribution layer 10, particularly where the first and second channels 30, 32 of the third fluid distribution layer 16 are not aligned with the first and second channels 26, 28 of the first fluid distribution layer 10. The first and second channels 30, 32 of the third fluid distribution layer 16 and the second channels 28 of the first fluid distribution layer 10 effectively combine for the distribution of the cathode reactant. The second fluid distribution layer 12 may be configured to distribute an anode reactant such as hydrogen from a pressurized hydrogen source, as a nonlimiting example.

It should be appreciated that the distribution of the coolant through the first channels 26 on the cathode-side of the electrically conductive substrate 4, as described hereinabove, may militate against an undesirably contamination of the anode side of the electrically conductive substrate 4 should there be an inadvertent coolant leakage during operation of the fuel cell 24. However, the distribution of anode reactant in the second channels 28 of the first fluid distribution layer 10, and the first and second channels 30, 32 of the third fluid distribution layer 16, and the distribution of the cathode reactant in the flow channels 42 of the second fluid distribution layer 12, is also within the scope of the present disclosure and the distribution.

The present disclosure also includes a method for fabricating the fuel cell component 2. Although the steps of the method are shown sequentially in FIGS. 8A-8H, it should be understood that the fabrication of the various polymeric structures forming the fuel cell component 2 may be performed substantially simultaneously, for example, as disclosed in Assignee's copending U.S. patent application Ser. No. 12/339,308.

As shown in FIGS. 8A-8B, the method first includes the step of providing the electrically conductive substrate 4 having the first surface 6 and the second surface 8. For example, the electrically conductive substrate 4 may be a stainless steel foil that is obtained from a roll of stainless steel. A plastic film with holes which is subsequently plated with the electrically conductive material 50 to make the plastic film conductive through the thickness, and also non-porous, may alternatively be employed. The roll of the electrically conductive substrate 4 may be processed, for example, by cutting, stamping, blanking, punching, or using other well known methods to form the cathode and anode reactant inlets 104, 106, the cathode and anode reactant outlets 108, 110, and the coolant inlet and outlet 112, 114. Other desirable features for the fuel cell component 2 such as stack health monitor (SHM) or cell voltage monitoring (CVM) tabs 116, alignment pins (not shown), and registration marks (not shown) may be formed into the electrically conductive substrate 4 at a perimeter or edge thereof.

A plurality of layers of radiation-sensitive materials may then be layered upon on the first surface 6 and the second surface 8 of the electrically conductive substrate 4. The layers of radiation-sensitive materials may have different sensitivities to at least one of radiation type and radiation intensity, for example, as described in Assignee's copending U.S. patent application Ser. No. 12/339,308. The layer of the radiation-sensitive materials may be conducted either before or after the roll is cut along pattern lines 118 to provide the individual plates of the electrically conductive substrate 4 for fabrication of the fuel cell component 2.

As illustrated in FIG. 8B, the first fluid distribution layer 10 having the plurality of first channels 26 and the plurality of second channels 28 is then formed on the first surface 6 of the electrically conductive substrate 4 by selective exposure of one of the radiation-sensitive materials to a plurality of radiation beams, for example, from one or more radiation sources. The first channels 26 and the second channels 28 travel from the coolant inlet 112 to the coolant outlet 114 of the electrically conductive substrate 4. The second channels 28 may have at least one flow blockage wall 120 formed thereacross to create dead-end paths for the coolant. The flow block walls 120 are particularly disposed in the second channels 28 at the coolant inlet 112 to militate against any flow of the coolant into the second channels 28. Dimensions of the coolant inlet 12 at the first header 100 may be wider to accommodate the limited flow area at the coolant inlet 112 resulting from the flow blockage walls 120. In addition to reducing a coolant volume of the fuel cell component 2, the flow blockage walls 120 provide an additional conduction path through the first fluid distribution layer 10 to the underlying electrically conductive substrate 4. It should be appreciated that the flow blockage walls 120 may therefore also be formed elsewhere along the fuel cell component 2, for example, in both the feeder areas and the active areas of the fuel cell component 2.

The first channels 26 may alternate with the second channels 28 in placement along a length of the electrically conductive substrate 4 from the coolant inlet 112 to the coolant outlet 114. The first channels 26 are configured to distribute the coolant through the fuel cell component 2. It should be appreciated that the first channels 26 thereby effectively form a coolant flowfield in the fuel cell component 2. The coolant may take a tortuous path across the fuel cell component 2 through the first channels 26, as shown in FIG. 8B, or may take other suitable paths, as desired. The second channels 28 that do not carry the coolant are instead configured to distribute the cathode reactant, for example, as shown in FIG. 8D, and form part of a cathode reactant flowfield of the fuel cell component 2.

The flow field pattern may include a wall about the perimeter of the electrically conductive substrate 4. This wall is also disposed around the cathode and anode reactant inlets 104, 106, and the cathode and anode reactant outlets 108, 110 as shown in FIG. 8B. As a nonlimiting example, this wall is formed from the same radiation-curable material as the first and second channels 26, 28 of the first fluid distribution layer 10. Following the formation of the first fluid distribution layer 10, an excess, uncured amount of the radiation-sensitive material may be removed, for example, by washing with a suitable solvent. Alternatively, the removal of excess radiation-sensitive material may be conducted in a single step near a completion of the fabrication method for the fuel cell component 2.

With reference to FIG. 8C, the cap layer 14 is formed on the first fluid distribution layer 10 by selective exposure of one of the layers of the radiation-sensitive material to a plurality of radiation beams from one or more radiation sources. The first channels 26 of the first fluid distribution layer 10 are covered by the cap layer 14, and the second channels 28 of the first fluid distribution layer 10 are not covered by the cap layer 14. For example, the cap layer 14 is formed atop each of the first channels 26. The flow blockage walls 120 are likewise covered by the cap layer 14. Although not covering the second flow channels 28 completely, the cap layer 14 may also provide additional bridging of the second flow channels 28 in order to support the subsequently added third fluid distribution layer 16 (shown in FIG. 8D). Like the fabrication of the first fluid distribution layer 10, the excess radiation-sensitive material from the cap layer 14 may be removed at this step or during a later step of the fabrication method for the fuel cell component 2.

Figure 8D:
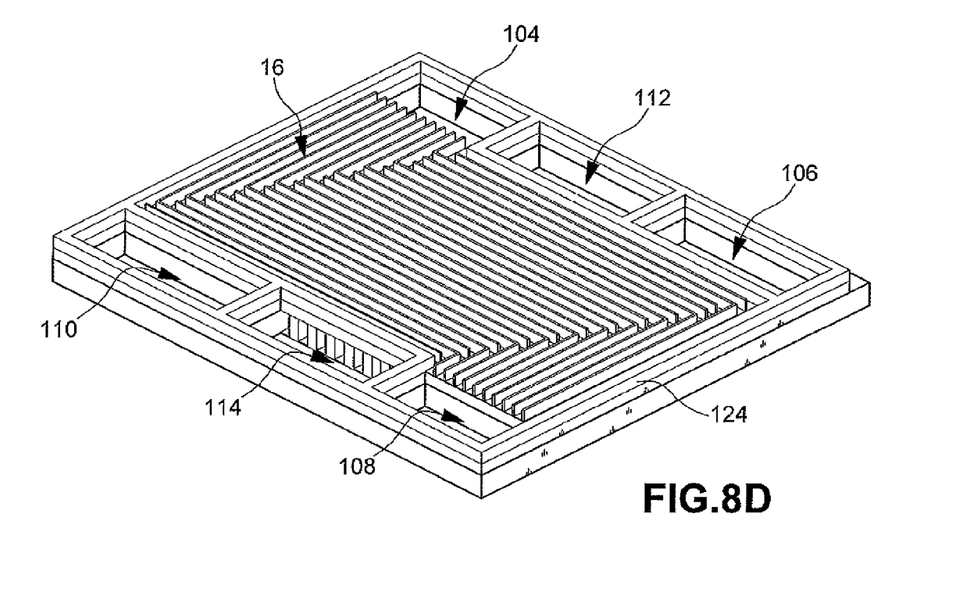

As illustrated in FIG. 8D, the third fluid distribution layer 16 is then formed on the cap layer 14, for example, by selectively exposing one of the layers of the radiation-sensitive material to a plurality of radiation beams from at least one radiation source. A first seal 124 is also formed at the perimeter of the electrically conductive substrate 4 and around the coolant inlets and outlets 112, 114 and the anode reactant inlets and outlets 106, 110. As a nonlimiting example, the first seal 124 is formed from the same radiation-curable material as the third fluid distribution layer 16. In another nonlimiting example, the first seal 124 is applied as a separate, polymeric gasket.

The third fluid distribution layer 16 has the plurality of first channels 30 and the plurality of second channels 32, each of which is configured to distribute the cathode reactant from the cathode reactant inlet 104 to the cathode reactant outlet 108. The first and second channels 30, 32 of the third fluid distribution layer 16, and the second channels 28 of the first fluid distribution layer 10, thereby form the cathode flowfield of the fuel cell component 2. The first channels 30 and the second channels 32 may exhibit a 2:1 branching, for example, as shown in FIG. 8D. However, a skilled artisan should appreciate that other flow path configurations may also be employed.

The cap layer 14 separates the first channels 26 of the first fluid distribution layer 10 from the permeable third fluid distribution layer 16. For example, the cap layer 14 may separate the first channels 26 of the first fluid distribution layer from the first and second channels 30, 32 of the third fluid distribution layer 16. Likewise, the cap layer 14 permits fluid communication between the second channels 28 of the first fluid distribution layer 10 and the third fluid distribution layer 16, for example, the first and second channels 30, 32 of the third fluid distribution layer 16. Like the fabrication of the first fluid distribution layer 10, and the cap layer 14, the excess radiation-sensitive material from the third fluid distribution layer 16 may be removed at this step or during a later step of the fabrication method for the fuel cell component 2.

Figure 8E:
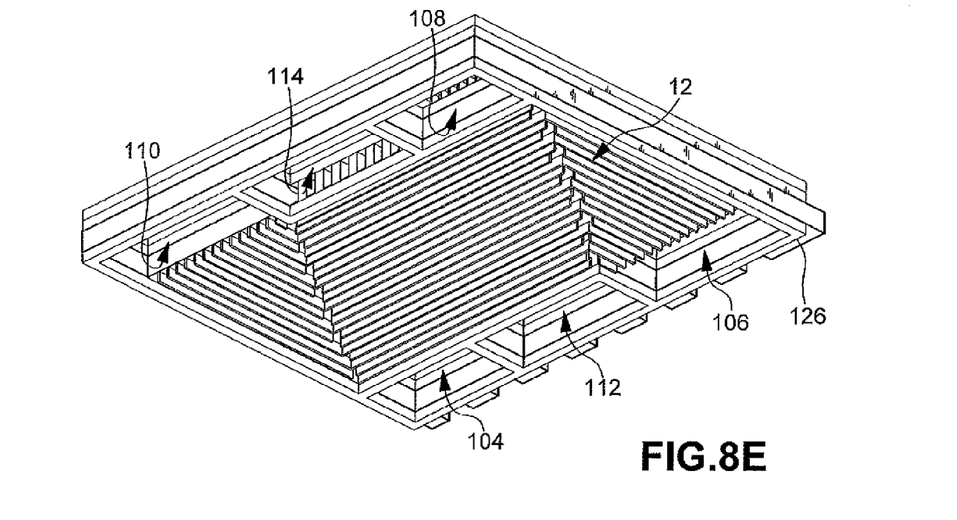

With references to FIG. 8E, the second fluid distribution layer 12 is formed on the second surface 8 of the electrically conductive substrate 4. A second seal 126 is also formed at the perimeter of the electrically conductive substrate 4 and around the coolant inlets and outlets 112, 114 and the cathode reactant inlets and outlets 104, 108. The anode flowfield of the fuel cell component 2 is thereby fabricated. Like the fabrication of the first fluid distribution layer 10, the cap layer 14, and the third fluid distribution layer 16, the excess radiation-sensitive material from the second fluid distribution layer 12 may be removed at this step or during a later step of the fabrication method for the fuel cell component 2. It may be particularly advantageous to conduct a removal of excess radiation-sensitive material from all steps illustrated in FIGS. 8B-8E following the fabrication of the anode flowfield, however, as subsequent steps of applying the diffusion medium layers 18, 20 may otherwise make more difficult the removal of excess radiation-sensitive material.

Following the removal of excess radiation-sensitive material, at least one of the second fluid distribution layer 12 and the third fluid distribution layer 16 may be treated with a hydrophilic coating, a hydrophobic coating, or a combination of both. Other treatments such as an application of surface texturing and the like are also within the scope of the present disclosure.

Figure 8F:
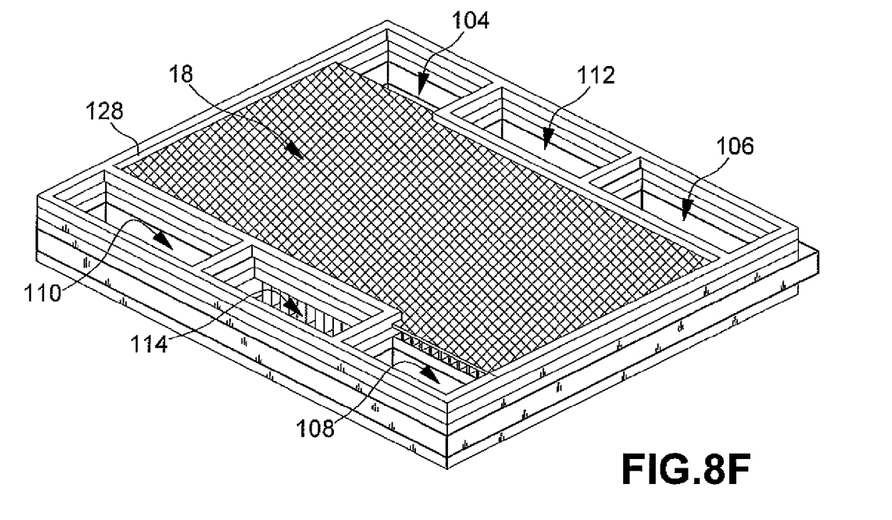
Figure 8G:
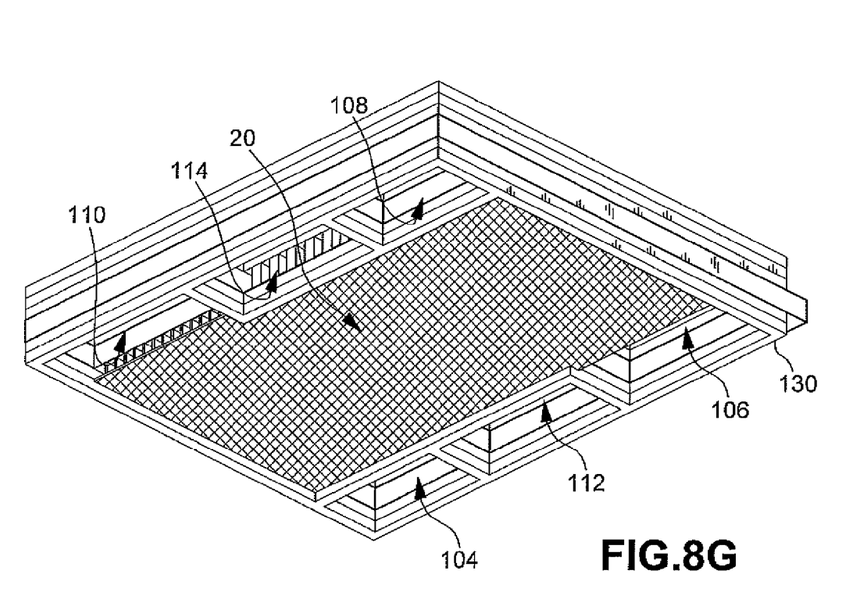

As illustrated in FIGS. 8F and 8G, the pair of porous diffusion medium layers 18, 20 may be formed on opposite sides of the electrically conductive substrate 4, for example, by selective exposure of ones of the layers of the radiation-sensitive material to a plurality of radiation beams from at least one radiation source. As a nonlimiting example, the diffusion medium layers 18, 20 may be in the form of thin slat- or grid-like polymeric structures. In particular embodiments, the first diffusion medium layer 18 is formed on the third fluid distribution layer 16, and the second diffusion medium layer 20 is formed on the second fluid distribution layer 12. The diffusion medium layers 18, 20 are configured to carry compression loads across the channels 30, 32, 42 of the third fluid distribution layer 16 and the second fluid distribution layer 12. Third and fourth seals 128, 130 may also be formed along with the porous diffusion medium layers 18, 20, or applied as separate polymeric gaskets, as desired. If the third and fourth seals 128, 130 are applied as separate gaskets, it should be appreciated that the porous diffusion medium layers 18, 20 are formed before applying the third and fourth seals 128, 130 thereto. If the third and fourth seals 128, 130 are formed as part of the diffusion medium layers 18, 20, then there is no separate application. The various seals may also be combined, where appropriate, in order to limit the number of separate seals in the fuel cell component 2.

It should be appreciated that, with the exception of the cap layer 14, the respective alignment of the electrically conductive substrate 4, the first fluid distribution layer 10, the second fluid distribution layer 12, the third fluid distribution layer 16, and the pair of diffusion medium layers 18, 20 is not particularly critical with the fuel cell component 2 of the present disclosure. This is because only the cap layer 14 needs to be particularly aligned with respect to the first fluid distribution layer 10 in order to cap selected channels of the first fluid distribution layer. The degree of difficulty associated with the fabrication method is thereby minimized.

The method also includes the step of plating both sides of the electrically conductive substrate 4 having the first fluid distribution layer 10, the second fluid distribution layer 12, the cap layer 14, and the third fluid distribution layer 16 with the electrically conductive coating 50. The plating step may be conducted before of after the steps of applying the diffusion medium layers 18, 20. If the plating step is conducted before the steps of applying the diffusion medium layers 18, 20, another plating step may be performed after the diffusion medium layers 18, 20 are applied. The other plating step may permit plating the electrically conductive coating 50 on the diffusion medium layers 18, 20 at a thickness less than a thickness of the electrically conductive coating 50 applied during the original plating step. It may also be desirable that the diffusion medium layers 18, 20 not be excessively conductive as a thermal gradient within the diffusion medium layers 18, 20 may facilitate water management in the fuel cell component 2. For example, the thermally gradient may drive water vapor partial pressure gradients that move water as a vapor to the cathode and anode flowfields. Alternatively, it should be appreciated that the plating of all of the first fluid distribution layer 10, the second fluid distribution layer 12, the cap layer 14, the third fluid distribution layer 16, and the diffusion medium layers 18, 20 may be advantageously performed in one plating step, and thereby reducing a manufacturing complexity of the fuel cell component 2.

Where the microporous layer 27 is employed, for example, for purpose of providing mechanical support for the membrane electrode assembly 22, the microporous layers 27 may next be applied to the diffusion medium layers 18, 20. The microporous layer 27 may be hydrophobic to further facilitate water management for the electrodes of the membrane electrode assembly 22. The microporous layer 27 may also be applied in the tunnel regions adjacent the headers 100, 102 of the fuel cell component 2 in order to provide seal support.

Figure 8H:
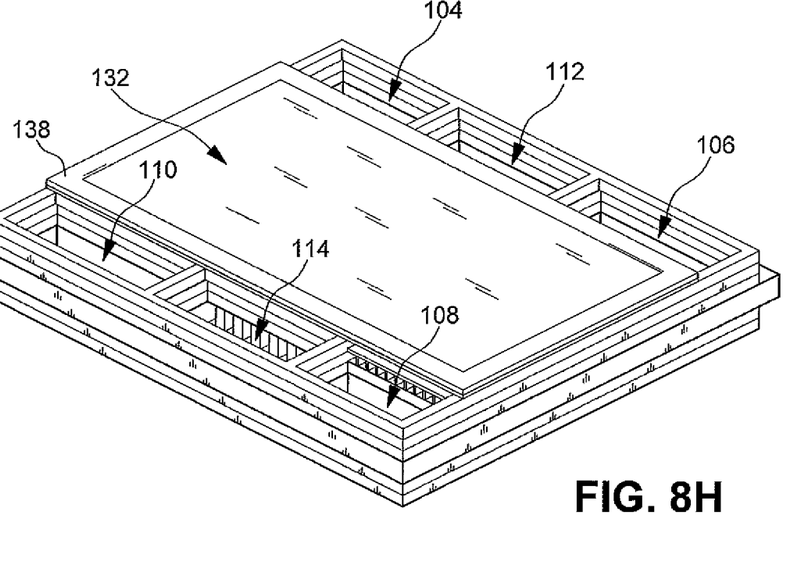

Referring now to FIG. 8H, the membrane electrode assembly 22, including a polymer electrolyte membrane 132 and sub-gasket 138 sandwiched between a pair of electrodes (not shown), is then applied to the fuel cell component 2. The components of the membrane electrode assembly 22 may be deposited onto diffusion medium layers 18, 20 or microporous layers 27, individually or together as an integral component.

Where the method illustrated in FIGS. 8B-8H is formed as a continuous process starting with the roll of the electrically conductive substrate 4, the individual fuel cell components 2 may be cut from the roll and stacked to form the fuel cell 24 according to the present disclosure.

A skilled artisan should appreciate that other considerations may dictate the overall design of the fuel cell component 2. For example, the various flow channels 26, 28, 30, 32, 42 may follow tortuous paths in order to militate against a scissoring of the diffusion medium layers 18, 20. Likewise, the slat- or grid-like diffusion medium layers 18, 20 may be angled in order to militate against an alignment with one another across the membrane electrode assembly 22.

In one embodiment, the flow patterns for the cathode reactant and the anode reactant may cross-flow with the flow pattern for the coolant through the fuel cell component 2. In another embodiment, the anode reactant flow may be counter-flow with the cathode reactant flow, with the coolant and cathode reactants being co-flow. Multiple cathode reactant inlets and outlets 104, 108, anode reactant inlets and outlets 106, 110, and coolant inlets and outlets 112, 114 may also be employed to retain low pressure drops across the fuel ell component 2 with conventional flow arrangements. Other arrangements of reactants and coolant cross-flows, counter flows, and co-flows may be employed, as desired.

It is advantageously found that the mechanical integration of the diffusion medium layers 18, 20 with the first, second, and third fluid distribution layers 10, 12, 16 eliminates contact resistance losses otherwise experienced in state-of-the-art fuel cells formed from mechanically separate components placed under compression. Also, the manufacturing sequence typically employed when using carbon fiber-based diffusion medium layers is eliminated through use of the fuel cell component 2 and related method of the present disclosure. The fuel cell component 2 and related method increases design flexibility and minimizes tooling requirements.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for fabricating a fuel cell component, the method comprising the steps of:
    providing an electrically conductive substrate having a first surface and a second surface, the first surface and the second surface disposed on opposite sides of the electrically conductive substrate;
    disposing a plurality of layers of radiation-sensitive material on the first surface and the second surface of the electrically conductive substrate;
    forming a first fluid distribution layer having a plurality of first channels and a plurality of second channels on the first surface of the electrically conductive substrate;
    forming a second fluid distribution layer on the second surface of the electrically conductive substrate;
    forming a cap layer on the first fluid distribution layer, the first channels of the first fluid distribution layer covered by the cap layer and the second channels of the first fluid distribution layer not covered by the cap layer;
    forming a third fluid distribution layer on the cap layer, the cap layer separating the first channels of the first fluid distribution layer from the third fluid distribution layer, the second channels of the first fluid distribution layer in fluid communication with the third fluid distribution layer; and
    forming a pair of diffusion medium layers including a first diffusion medium layer and a second diffusion medium layer, the first diffusion medium layer formed on the third fluid distribution layer, and the second diffusion medium layer formed on the second fluid distribution layer,
    wherein the first fluid distribution layer, the second fluid distribution layer, the cap layer, the third fluid distribution layer, and the pair of diffusion medium layers are formed by selectively exposing the plurality of layers of radiation-sensitive material to a plurality of radiation beams from at least one radiation source.

2. The method of claim 1, further comprising the steps of:
    removing an uncured portion of the radiation-sensitive material; and
    plating at least part of the cured portion of the radiation-sensitive material with an electrically conductive coating having a single plating thickness.

3. The method of claim 2, further comprising treating at least one of the second fluid distribution layer and the third fluid distribution layer with a member selected from the group consisting of a hydrophilic coating, a hydrophobic coating, and a combination thereof.

4. The method of claim 1, wherein the first fluid distribution layer includes a plurality of first polymeric ribs extending outwardly from the first surface of the electrically conductive substrate, the first channels of the first fluid distribution layer defined by first spans between the first polymeric ribs, and the second channels of the first fluid distribution layer defined by second spans between the first polymeric ribs.

5. The method of claim 1, wherein the cap layer includes a plurality of polymeric cap segments, the cap segments bridging the first spans between the first polymeric ribs.

6. The method of claim 1, wherein the third fluid distribution layer has a plurality of first channels and a plurality of second channels disposed on the cap layer, the cap layer separating the first channels of the first fluid distribution layer from the first channels of the third fluid distribution layer, the second channels of the first fluid distribution layer in fluid communication with the second channels of the third fluid distribution layer, and wherein the third fluid distribution layer includes a plurality of third polymeric ribs extending outwardly from the polymeric cap segments, the third polymeric ribs forming the first channels and the second channels of the third fluid distribution layer.

7. The method of claim 1, wherein the second fluid distribution layer includes a plurality of second polymeric ribs extending outwardly from the second surface of the electrically conductive substrate, the second polymeric ribs forming the channels of the second fluid distribution layer.

8. The method of claim 1, wherein the second fluid distribution layer is formed from a polymeric micro-truss network.

9. The method of claim 1, wherein the second fluid distribution layer includes a plurality of channels.

10. The method of claim 1, wherein each of the first diffusion medium layer and the second diffusion medium layer is formed from a polymeric grid having a plurality of first walls and a plurality of second walls that intersect the first walls.

11. The method of claim 1, further comprising an electrically conductive coating deposited on each of the electrically conductive substrate, the first fluid distribution layer, the second fluid distribution layer, the third fluid distribution layer, the cap layer, and the first diffusion medium layer and the second diffusion medium layer.

12. The method of claim 11, wherein the electrically conductive coating is not formed on an inner surface of each of the first channels of the first fluid distribution layer, an inner surface of the cap layer covering each the first channels of the first fluid distribution layer, and a surface of the electrically conductive substrate opposite the inner surface of the cap layer.

13. The method of claim 1, wherein the electrically conductive substrate is a stainless steel foil.

14. The method of claim 1, wherein the first fluid distribution layer, the second fluid distribution layer, the third fluid distribution layer, the cap layer, and the pair of diffusion medium layers are formed by photopolymerization.

15. The method of claim 1, wherein the electrically conductive substrate includes a pair of headers with reactant inlets and outlets and coolant inlets and outlets, the first fluid distribution layer, the second fluid distribution layer, the third fluid distribution layer, the cap layer, the first diffusion medium layer and the second diffusion medium layer disposed between the headers.

16. The method of claim 15, wherein the first fluid distribution layer is configured to distribute a coolant in the first channels of the first fluid distribution layer and a cathode reactant in the second channels of the first fluid distribution layer, the second fluid distribution layer is configured to distribute an anode reactant, and the third distribution layer is configured to distribute the cathode reactant.

17. The method of claim 16, further comprising a membrane electrode assembly disposed adjacent at least one of the first diffusion medium layer and the second diffusion medium layer.

18. The method of claim 17, wherein a microporous layer is disposed between the membrane electrode assembly and the at least one of the first diffusion medium layer and the second diffusion medium layer.

19. The method of claim 17, wherein the electrically conductive substrate includes a pair of headers, the first fluid distribution layer, the second fluid distribution layer, the third fluid distribution layer, the cap layer, first the diffusion medium layer and the second diffusion medium layer disposed between the headers.

20. A method of fabricating a fuel cell, the method comprising the steps of:
   fabricating a pair of fuel components, each fuel cell component fabricated according to the method of claim 1;
   arranging the pair of fuel cell components in a stack; and
   disposing a membrane electrode assembly between the pair of fuel cell components.

* * * * *